United States Patent Office 3,535,712
Patented Oct. 27, 1970

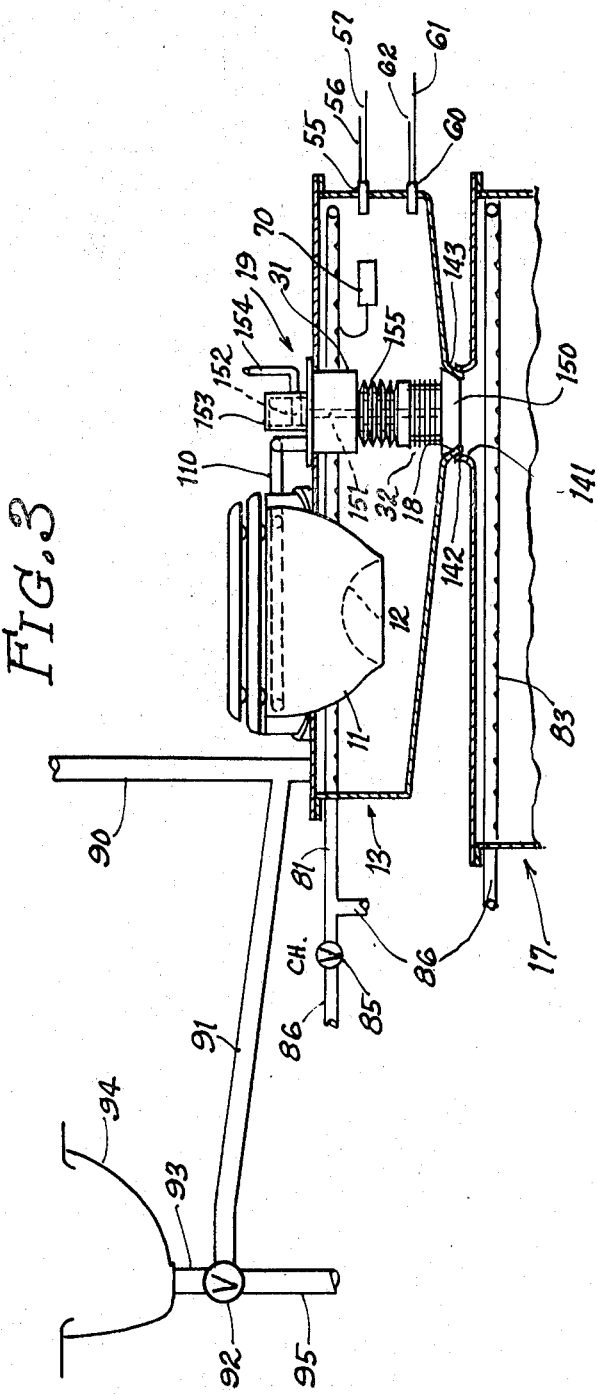

3,535,712
TOILET AND WASTE STORAGE SYSTEM
Jack D. Zeff, Deerfield, and George C. Roberts, Evanston, Ill., assignors to General American Transportation Corporation, a corporation of New York
Filed Dec. 20, 1967, Ser. No. 692,062
Int. Cl. E03d 1/00, 11/10
U.S. Cl. 4—10                              21 Claims

ABSTRACT OF THE DISCLOSURE

A system that receives and treats waste from and furnishes flushing liquid to a toilet includes first and second tanks, a valved conduit between them to maintain waste in the first tank within two predetermined levels. The first tank receives waste from a toilet. In the second tank a heater removes at least some of the aqueous content of the waste and part may be condensed to provide flushing liquid. Preferably, a filter and a pump withdraw filtered liquid from the first tank to provide the flushing liquid.

BACKGROUND OF THE INVENTION

Field of the invention

This invention relates to a system or apparatus and to a method for receiving human body wastes and treating at least a part of the waste in a manner to provide flushing liquid to a toilet bowl.

Description of the prior art

In various vehicles, such as airplanes, buses, boats and trains, and sites lacking conventional sewage treatment systems there has existed a need for the storage and disposal of wastes received from toilets.

Under the conditions where a water supply is very limited it has been proposed to use a waterless toilet. An illustrative system is the incinerator toilet described and claimed in U.S. Pat. No. 3,169,497. The human wastes are transferred from a toilet bowl to an incinerator chamber in which the waste is converted to ash. The volatile material is removed from the incinerator chamber by a blower. None of the aqueous content of the human waste is utilized.

Several developments have produced systems that are referred to as self-contained sewage or toilet systems. These systems have a flush toilet bowl mounted on a tank that contains at the start of service of the system, an aqueous solution suitable for flushing the toilet. The aqueous solution also contains chemicals to provide a deodorization of waste material received in the tank from the toilet. During service use the volume of liquid in the tank increases. Eventually, the amount of liquid in the tank precludes any further use of the system until it has been serviced. In this system there is provided a combination of a filter and a pump by which the mixture of waste liquid and initial water in the tank is drawn to the filter which permits the passage of filtrate to the inlet of the pump. Flushing liquid in the form of this filtrate is fed to the toilet bowl by the outlet of the pump. Such systems are described in U.S. Pats. Nos. 3,067,433 and 3,343,178. Another patent (U.S. Pat. No. 3,172,131) describes and claims a specific improvement that is especially useful with the system of U.S. Pat. No. 3,067,433. U.S. 3,067,433 states that a self-cleaning filter of known construction can be used. An alleged improved filter is disclosed and claimed in U.S. Pat. No. 3,342,341 which also discloses the entire self-contained sewage system.

The systems described in the next preceding paragraph utilize a relatively deep tank and provide an initial charge of aqueous liquid in an amount to occupy less than one half of the volumetric capacity of the tank, i.e., the capacity beyond which the system should not be used until serviced. In each of such systems the distance from the top of the tank to the top of the initial charge of aqueous liquid is required to be substantial so as to permit the use of the system for a considerable number of times before the system requires servicing. For this reason the outlet of the toilet bowl is required to be at the topmost portion of the tank and for a number of other reasons tthis outlet is required to extend laterally within this topmost portion of the tank.

A previous system is exemplified by U.S. Pat. No. 2,858,939 in which the waste liquid from the toilet is ground and filtered. The filtrate is transferred to another tank for later use in a flushing operation. The filter transfers the solids to a tank below the filter.

In U.S. Pat. No. 3,079,612 there is disclosed and claimed a tank receiving human body waste from two toilets and a double drive filter and pump that selectively provide flushing liquid to one or the other toilet.

None of the systems to date provides an overall system for receiving waste liquid, utilizing part of it to provide a flushing liquid and transferring part of the liquid from the initial receiving tank to another tank for volumetric reduction. The system based on incineration provides a volume reduction but does not provide for any cyclic use of aqueous content for flushing operations. As a matter of fact, such systems as described in the prior art are incapable of providing such function. The systems developed to date that do utilize a cyclic operation for providing flushing liquid from collected waste have a relatively limited capacity that results in too frequent servicing requirements and have other disadvantages to be discussed later below.

SUMMARY OF THE INVENTION

This invention relates to a system or apparatus and to a method for the receiving of human body wastes and at least the partial treatment of the same while at the same time providing a maintenance of flushing liquid for and to a toilet. The invention reduces substantially the volume of waste that is received while at the same time permitting the disposal of the discarded material in a form that does not provide substantial atmospheric pollution and preferably does not provide any of such pollution. This system and method result in a decrease in the advantageous overall or gross weight of the occupied vehicle, such as an airplane, during its use. The system permits the use of a compact system with a large increase in its service use between required service maintenance operations. Other advantages will be mentioned later.

The system of the present invention comprises (1) a first tank having an opening in its bottom and having another opening to be connected to a conduit connected to a toilet bowl to receive waste liquid from the bowl, (2) a second tank having first and second openings, (3) conduit means connecting the second tank at its first opening to the first tank by the bottom opening of the first tank for communication between the tanks, (4) valved means to selectively close and open the communication between the tanks by the conduit means, (5) liquid level-sensing means responsive to predetermined maximum and minimum levels of liquid in the first tank to operate said valved means for opening and closing, respectively, the valved means, (6) heater means mounted on the second tank to volatilize out its second opening at least part of the waste liquid transferred from the first tank to the second tank through the conduit means, and (7) means to provide aqueous liquid from one of said tanks to serve as a flushing liquid for the toilet bowl.

In one embodiment of the system of this invention, the means to provide aqueous liquid from the waste in one of the tanks comprises a pump having an inlet in the first tank and having an outlet to communicate by a conduit with the upper portion of the toilet bowl. This means to provide aqueous liquid also includes a filter mounted in the first tank and interposed between the inlet of the pump and the interior of the first tank to provide filtered aqueous liquid to the pump for ultimate transfer to the toilet bowl as a flushing liquid.

In an alternative embodiment of the system of the invention, the means to provide aqueous liquid from one of the tanks to serve as a flushing liquid for the toilet bowl includes a condenser communicating with a conduit connected to the second opening of the second tank for receiving volatilized aqueous material from the second tank. At least part of the vapor is condensed and this aqueous liquid is used as a flushing liquid for the toilet bowl.

In another embodiment of the invention, the second tank is in communication with two or more first tanks by a corresponding number of conduit means. Each first tank is located to receive waste from an associated toilet bowl. In this case, the second tank can be located in a remote position relative to the first tanks and preferably in this case the means to provide a flushing liquid constitutes a filter and pump associated with each first tank.

In the case of the embodiments of the system in which a first tank has associated with it a pump and a filter to provide filtered liquid from the waste liquid in the first tank, the system can be described in a more limited manner as comprising (1) a first tank having an opening in its bottom and an opening in its top portion to be connected to a conduit connected to a toilet bowl to receive waste from the bowl, (2) a second tank having an opening, (3) conduit means connecting said second tank at its opening to said first tank by the opening in its bottom to provide communication between said tanks, (4) signal-initiated valved means to selectively close or open said communication between said tanks by said conduit means, (5) a pump having an inlet in said first tank and having an outlet to communicate by a conduit with the upper portion of the toilet bowl, (6) a filter interposed between the inlet of said pump and the interior of said first tank to provide filtered liquid to the pump from the contents in said first tank, (7) signal-producing means responsive to a maximum level and to a minimum level of fluid in said first tank to provide initiation, respectively, of said opening and closing of said valved means, (8) heater means mounted to impart thermal energy to the interior of said second tank to provide volatilization at least of part of the waste liquid transferred to said second tank from said first tank, and (9) conduit means communicating with said second tank to remove evaporated material volatilized by the heater means.

The invention as a process comprises (1) transferring human body waste from a toilet bowl to a first chamber, (2) transferring waste liquid from the first chamber to a second chamber when the level of the waste liquid in the first chamber reaches a predetermined maximum level, (3) ceasing the transfer of the waste liquid from the first chamber to the second chamber when the level of the waste liquid reaches a predetermined minimum level, (4) evaporating at least part of the aqueous content of the transferred waste liquid from the second chamber, (5) removing vapor formed by the evaporation of waste liquid in the second chamber, and (6) obtaining aqueous liquid from one of the chambers to provide a flushing liquid for the toilet bowl.

As in the case of the system of the invention, the process of the present invention can provide the aqueous liquid for use as a flushing liquid for the toilet bowl by condensing at least part of the evaporated material removed from the second tank. Alternatively, this aqueous liquid can be provided by withdrawing liquid from the waste liquid in the first tank through the steps of pumping liquid from the first tank while filtering the liquid being withdrawn.

In the foregoing description of the invention reference has been made to the closing of the valved means between the first tank and the second tank, i.e., the ceasing of transfer of waste liquid from the one tank to the other in the case of the process, when the level of waste liquid in the first tank has been lowered to a predetermined height. This has been described as occurring, e.g., when a level-sensing means indicates the level has been reduced to this height. In carrying out the present invention as a system or as a process, this is preferable, but the invention can also be carried out or utilized by the use of conditions that permit this reduction in height to approximately such predetermined level. Once the transfer is started by opening the valve of the valved means the time during which it remains open can be predetermined. This time can be adjustable. It is preferably less than the time required for the level of water in the first tank to drop from the maximum height to the predetermined desired minimum height. Of course, with the waste liquid the level may not drop to this minimum height, but this merely means that the transfer by the opening of the valve will occur more frequently.

DESCRIPTION OF THE DRAWINGS

Preferred embodiments of the toilet and waste storage system of the present invention are illustrated in the drawings in which general similar parts are identified by the same numerals and in which:

FIG. 3 is a fragmentary cross-sectional view, partially schematic, of a further embodiment of the system of the invention and differs from the system of FIG. 2 by a construction that provides for portability only of the second or evaporator tank, and showing the use of a modified filter construction such that the filter serves also as a dump valve for the first or receiving tank.

Referring to FIG. 1, the system in this embodiment has a toilet bowl 11 having a bottom outlet 12 that extends laterally within a receiving tank generally indicated at 13. In FIG. 1 (as well as FIGS. 2 and 4) toilet bowl 11 is shown as it would appear after rotation 90° about its vertical axis from its normal disposition in this system and in conventional existing systems. This is done merely to show more clearly the lateral disposition of bottom outlet 12 that is closely adjacent a bottom wall 14 of tank 13.

Figure 1:
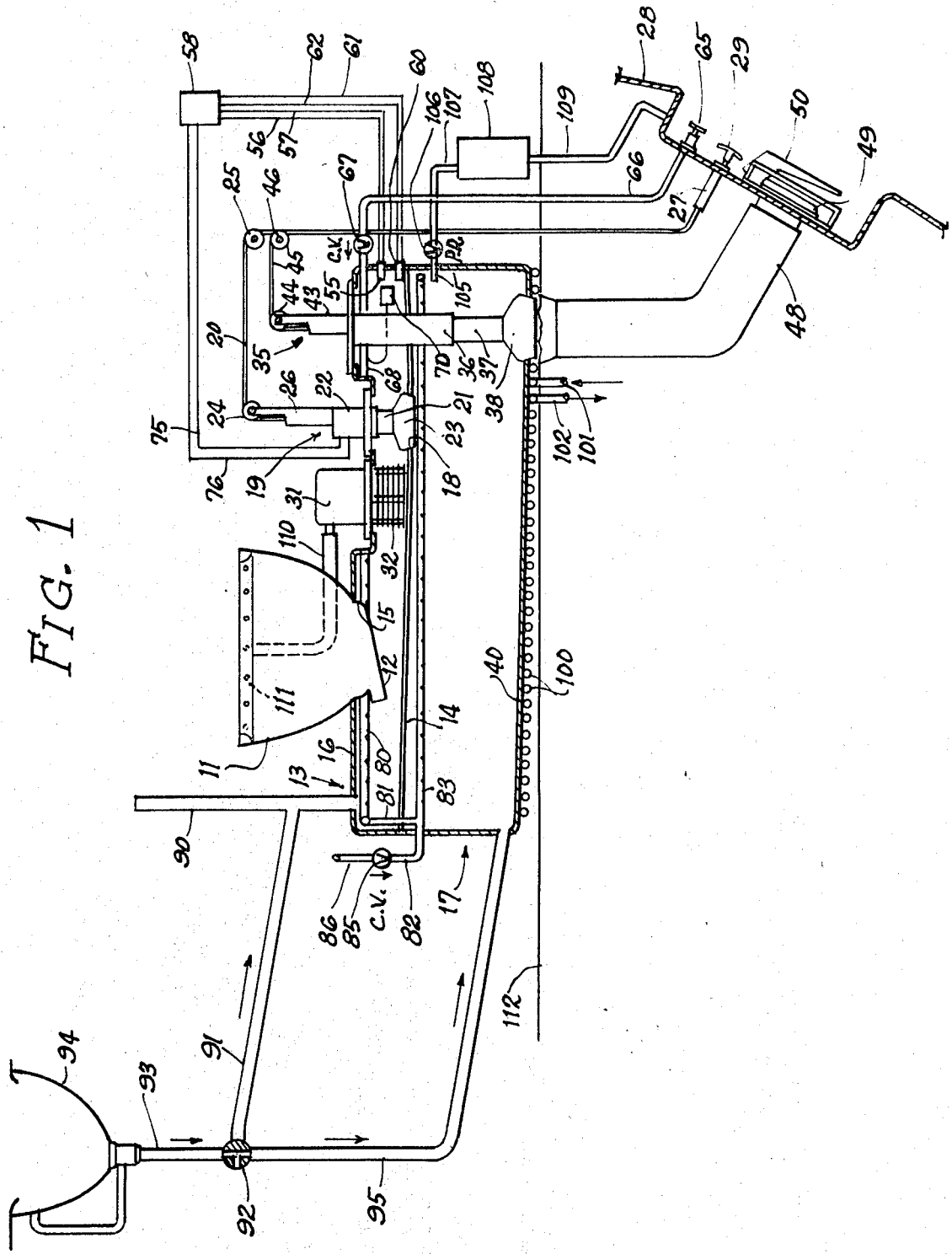
FIG. 1 is a cross-sectional view, partially schematic, of an embodiment of the system.

In this embodiment of FIG. 1, toilet bowl 11 is is mounted on tank 13 and extends through an opening 15 in the top wall 16 of tank 13. The tank 13 is mounted above a second or evaporating tank generally indicated at 17. The bottom wall 14 of tank 13 is thus top wall of tank 17. The bottom wall 14 is inclined along its longitudinal axis from both ends to an opening 18 that is, of course, the first or top opening of tank 17. This common opening 18 also serves as a conduit means between tank 13 and tank 17. The opening 18 is closed by a solenoid-operated, spring-biased dump valved means generally indicated at 19 that is supported above by mounting on top wall 16. A cable 20 is connected to the upper end of a shaft 21. The shaft 21 is an armature and it is raised with compression of the spring (not shown) when current passes through a coil 22 of solenoid-operated valved means 19. The shaft 21 supports a bulbous valve 23 on its bottom end. The valve 23 closes opening 18 except when coil 22 is energized.

The cable 20 extends over pulleys 24 and 25. The pulley 24 is rotatably supported by an upright extension 26 of the casing of coil 22. The pulley 25 is rotatably supported by an upright (not shown). The cable 20 passes through a sleeve 27 mounted on a wall 28 of a fuselage of an airplane. This end of cable 20 is connected to a handle 29 which can be pulled from outside the airplane to raise manually valve 23 during servicing as described later.

A pump 31 is mounted on wall 16 of tank 13. The pump 31 and its motor (not shown) support a filter 32 in tank 13. The bottom of filter 32 is adjacent bottom wall 14 of tank 13 which is preferably a shallow tank. The filter 32 is one of conventional known constructions that are available. These are self-cleaning. The inlet of pump 31 that is shown, is within filter 32.

The toilet 11 is mounted on a portion of top wall 16 that is at a higher level than the central portion of that wall. There is also a raised portion of wall 16 on the other side of the mounting of pump 31 and valved means 19. At this other raised elevation of wall 16 there is mounted a valved means generally indicated at 35 which has a sleeve 36 in which is mounted a shaft 37 that is biased downwardly by a spring (not shown). The sleeve 36 extends entirely through tank 13 and into tank 17. The bottom end of shaft 37 is a bulbous valve 38 that closes a second opening 39 that is in the bottom wall 40 of tank 17. Of course, the sleeve 36 extends through an opening in and is sealed to wall 14 of tank 13 to prevent flow of liquid from tank 13 to tank 17 at this opening.

The sleeve 36 has an upright extension 43 on which is rotatably mounted a pulley 44 over which extends a cable 45 connected at one end to shaft 37. The cable 45 also extends over a pulley 46 and cable 45 is connected at its other end to handle 29. Thus, manual pulling of handle 29 raises valve 38 as well as valve 23. The raising of valve 38 results in flow of liquid from tank 17 out opening 39. A conduit 48 is connected to tank 17 at opening 39. The conduit 48 extends through wall 28 and has a connector 49 that is closed by a hinged cap 50. The connector 49 of conduit 48 is joined to a connector of a conduit (not shown) that will dump liquid from tank 17 into a tank on a truck in the servicing operation to be described later. Of course, for making this connection hinged cap 50 is pivoted out of the way.

The tank 13 is provided with a normally open level-sensing switch 55 mounted to indicate a predetermined maximum level of liquid in tank 13. The switch 55 is closed by the rise of liquid to this maximum level. The switch 55 has its contacts (not shown) connected to wires 56 and 57 that extend to a control 58. The switch 55, wires 56 and 57, and control 58 constitute a liquid level-sensing means responsive to a predetermined maximum level of liquid in tank 13. The switch 55 and wires 56 and 57 are in a circuit to be described later.

Also mounted in tank 13, at a level below switch 55, is a normally open level-sensing switch 60 that is connected by wires 61 and 62 to control 58. The switch 60 is closed by liquid rising to the level of switch 60. Of course, switch 60 is closed while the level of liquid in tank 13 is at least equal in height to a predetermined minimum level.

The control 58 is connected to a power source (not shown) to provide a voltage potential for circuits described below. These circuits are not shown in the drawings because the details of these illustrative control circuits are conventional and they form no express part of the claimed invention. In one circuit, a coil of a first relay having a pair of normally open contacts is in series with switch 55. The coil is also in series with a holding circuit that includes one of the normally open contacts of that relay along with a normally open contact of a coil of a second relay having that normally open contact of a coil of a second relay having that normally open contact. This other relay has its coil in a circuit in series with the second contact of the first relay and with switch 60.

Before the initial use of the system, tank 13 is provided with flushing liquid that includes disinfectant and other chemicals. Such liquids are well known in the art. This liquid is provided by the transfer of liquid from a tank on a truck having a pipe joined to a connector 65 of a pipe 66. The pipe 66 is connected through a check valve 67 to a spray ring 68 mounted in tank 13 in the raised portion surrounding valved means 35. As liquid is forced into tank 13 through spray ring 68 the level rises. This is because valved means 19 is closed. A liquid-level float indicator 70 is mounted in tank 13 and it has a remote dial (not shown) visible to an operator who is transferring the liquid to pipe 66 from the tank on the truck. Pumping of liquid to tank 13 is stopped by him when float 70 indicates that the desired initial level of liquid in tank 13 has been reached.

In the meantime, switch 60 has closed. During the use of the system the volume of liquid in tank 13 will increase with use of toilet 11. As a result the level of liquid in tank 13 will rise until switch 55 is closed to energize the coil of the first relay. This energization of the coil will close both of its normally open contacts. The contact that is in series with now-closed switch 60 results in energization of the coil of the second relay to close its normally open contact in the holding circuit for the first coil. The holding circuit is now completely connected and the first coil remains energized. This coil can have another normally open contact in series in another circuit with coil 22 of valved means 19 by wires 75 and 76. As a result, current now flows through coil 22 to raise valve 23. This permits flow of liquid from tank 13 to tank 17.

This opening of valve 23 and flow of liquid to tank 17 continues until switch 60 is above the level of liquid in tank 13. The switch 60 opens to de-energize the coil of the second relay. This opens the normally open contact of the second relay in the holding circuit for the coil of the first relay. This holding circuit became necessary when valve 23 was opened because immediately the flow of liquid from tank 13 resulted in the opening of switch 55.

The raised portion of top wall 16 of tank 13 on which tank 11 is mounted has a spray ring 80 connected by a pipe 81 to a pipe 82 which is also connected to a spray ring 83 extending around the perimeter of tank 17 adjacent its top. The pipe 82 is connected by a check valve 85 to a pipe 86 that communicates with a source of liquid used to flush and clean tanks 13 and 17.

The tank 13 is provided with a vent pipe 90 extending downwardly through top wall 16. A pipe 91 is connected to pipe 90 adjacent tank 13. The pipe 91 is connected by a three-way valve 92 and a pipe 93 to a wash basin 94. The valve 92 is connected to tank 17 by a pipe 95. Usually, valve 92 is turned to connect basin 94 with pipe 91 and thus tank 13 instead of being connected to tank 17. This is especially the case when tank 17 is being heated so that it is necessary to avoid undesirable odors from reaching basin 94 from tank 17. However, the wash basin can be used to provide cleaning and flushing liquid indirectly from a water source. This will supplement liquid from spray ring 83 and provide a force of water substantially parallel to the inclined bottom 40 of tank 17.

A heating pipe 100 is mounted on tank 17 below bottom wall 40 to provide substantially uniform heat at the bottom. The pipe has an inlet 101 and an outlet 102. In this illustrative case, pipe 101 is furnished hot bleed air available from the airplane. The pipe 102 communicates with an exhaust outlet (not shown) to dump this air outside the airplane.

The tank 17 is also provided at its upper portion with an outlet pipe 105 connected by a relief valve 106 and pipe 107 to a biological and odor filter 108 that has its outlet connected by a pipe 109 to an opening in wall 28 of the fuselage of the airplane. The pipe 100, as a heating means, raises the temperature of liquid in tank 17, that has been transferred from tank 13, sufficiently for boiling of this liquid. In the use contemplated bleed air can provide sufficient thermal energy by boiling of the liquid at cabin pressure. At such pressure relief valve 106 is opened so that evaporated vapors pass out of tank 17 through filter 108 and are dumped as vapors from pipe 109.

The filtered liquid is transferred by pump 31 to a pipe 110 that is connected at its other end to a flushing ring 111 mounted in the top portion of toilet bowl 11 in a conventional manner. This liquid flushes human body waste out of bowl 11 through its bottom outlet 12 and into tank 13.

Figure 2:
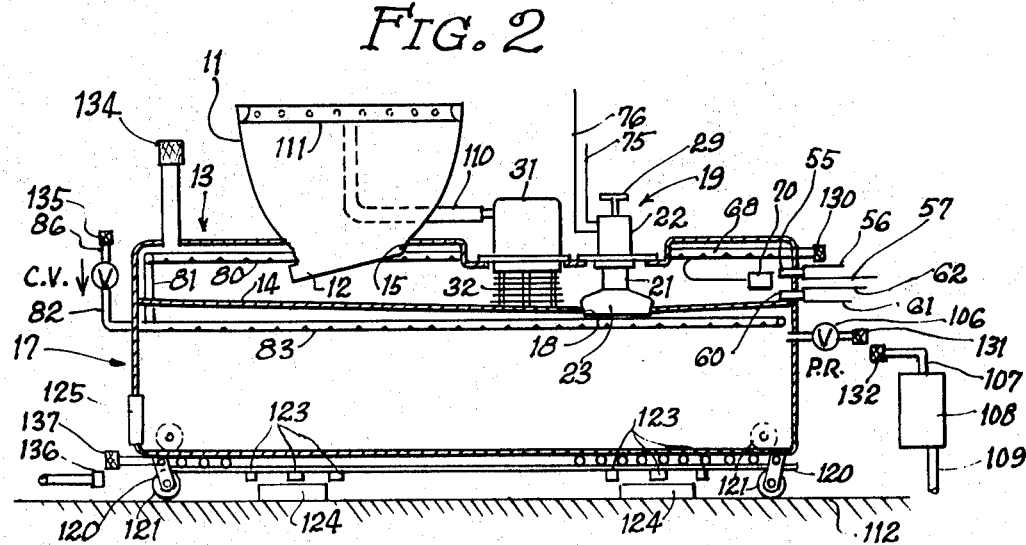
FIG. 2 is a cross-sectional view, also partly schematic, of another embodiment of the system in which the system is built to have portability for servicing.
Figure 4:
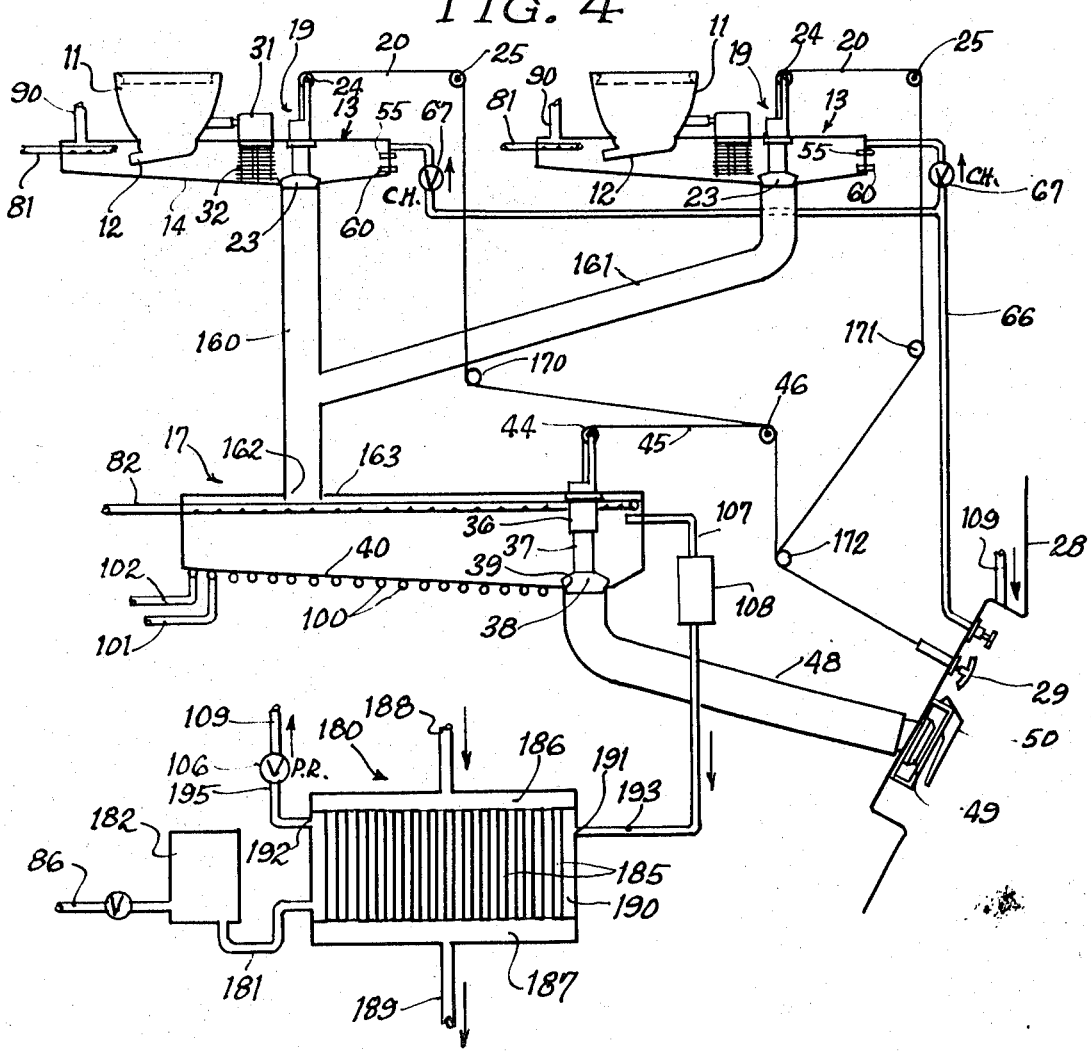
FIG. 4 is a cross-sectional view, partially schematic, of an embodiment of the system in which two toilet bowls and two receiving tanks with their associated filters and pumps for toilet flushing recirculation are in communication with a common evaporator tank.

In the system disclosed in FIG. 1, as well as the other embodiments disclosed in FIGS. 2, 3 and 4, there is no showing of support structure for the system. However, there is a phantom line 112 in FIGS. 1 and 2 that represents the floor of the passenger part of the airplane and thus the floor of the toilet room in which the system is located. As in previously existing systems, the basic parts of the system disclosed in FIG. 1 can be incorporated in a compact package and various pipe and outlets are connected to components of this package in a manner well known in the art. For example, the package can be connected to pipe 90 and outlet pipe 48 as well as to pipe 66 and dump pipes 107 and 109, the latter through intermediate filter 108. In a modification of this system filter 108 can be located in tank 17. In that modification relief valve 106 is preferably in the vapor outlet system downstream of filter 108, rather than between it and tank 17 as shown for FIG. 1.

In FIG. 2 another embodiment of the invention is presented. There are two tanks, namely, tanks 13 and 17, as in the case of FIG. 1. The bottom wall 14 of tank 13 again serves as the top wall of tank 17. The construction of the system of FIG. 2 is the same as the construction of the embodiment of FIG. 1 except as described below.

In this embodiment the combination of tanks 13 and 17 with bowl 11 mounted on tank 13 constituting a package that is portable. This portability is accomplished by the presence of pairs of supports 120 on which are mounted wheels 121. The supports 120 are pivotally mounted on the base structure of tank 17. When supports 120 extend downwardly as shown in full lines in FIG. 2, wheels 120 are in contact with floor 112 so that the bottom of tank 17 is spaced from the floor and this package can be positioned for removal from the toilet room for servicing.

After servicing, the package is wheeled into place. In this illustration the bottom structure of tank 17 has at the front portion and at the rear portion four lugs 123 that are disposed about a rectangle. The lowering of the package by the raising of supports 121 places the lugs 123 of each set in abutment with rectangular pedestals 124 secured on the floor. This arrangement prevents to and fro movement and lateral movement of the package while the package is available for use in the toilet room. The raised wheels 121 are shown in phantom.

The embodiment of FIG. 2 also differs by the lack of valved means 35 that is present in the embodiment of FIG. 1. To provide the servicing of the package a door 125 is mounted in one end wall of tank 17. After removal of the package to a servicing location, door 125 is opened to provide access to the interior of tank 17 for cleaning tank 17.

In this construction of the embodiment of FIG. 2 there is no need for pipe 48 that extends from tank 17 to the servicing portion of the fuselage in the case of the embodiment of FIG. 2. However, this embodiment does require the presence of pipe 66 and connection 65 to introduces flushing liquid into tank 13 by spray ring 68. Because of the portability of the package, pipe 68 and check valve 67 are connected by a male coupling element (not shown) that is joined to a female coupling element 130. In a similar manner, there is a female coupling element 131 connected to relief valve 106 and a male coupling element 132 connected to pipe 107. The inlet pipe 90 is also provided with a quick disconnect coupling including female coupling element 134. The pipe 86 is likewise provided with a quick disconnect coupling including a female coupling element 135. The inlet pipe 101 and the outlet pipe 102 are connected to pipe 100 by a quick disconnect coupling including coupling elements 136 and 137. These quick disconnect couplings are utilized to unite the various pipes after the package is moved into position in the toilet room and after wheels 130 have been raised to lower the package, as described above. In this secured positioning of the package, such coupling elements can be joined and obviously some will require some flexible piping or pivot joints for movement of certain piping out of the direction of travel when the package is moved to and from the toilet room.

Of course, wash basin 94 can be connected to the package shown in FIG. 2 in the same manner as presented in FIG. 1. It is to be noted that the bottom floor of tank 17 is horizontal rather than inclined. This is the preferred construction because the package can be tilted about a horizontal axis at the left (as viewed in FIG. 2) during a flushing treatment for removal of material from tank 17.

In the embodiment of the invention shown in FIG. 3, the construction is similar to that shown in FIG. 2 except as described below. In this embodiment tank 13 does not have a common wall with tank 17. Thus, tanks 13 and 17 are two entirely separate tanks. The tank 17 has a top wall 140 with an opening 141 at which there is an upstanding peripheral flange 142. When tank 17 is raised flange 142 engages a peripheral flange 143 at opening 18 of tank 13. The tank 17 has a wheeled support such as that of FIG. 2 depicted by pivotal supports 120 and wheels 121. However, the supports 121 in this embodiment are rigid. They are not required to be pivotally mounted, because tank 17 after positioning below tank 13 in the toilet room is raised for flange 142 to engage the outer surface of flange 143. This engagement provides a conduit means between tank 13 and tank 17. This raising of wheel-supported tank 17 can be accomplished by a pneumatic lift with subsequent latching of tank 17 in the raised position to support structure (not shown). Thereafter, the lift mechanism is not required until tank 17 is to be removed for servicing.

In this embodiment of FIG. 3 pipe 81 is permanently connected to pipe 86 through check valve 85 but pipe 86 is connected to tank 17 by a quick disconnect coupling in the manner shown for coupling element 135 in FIG. 2. Similarly, there is a quick disconnect coupling having elements 136 and 137 for tank 17 as in the case of FIG. 2. There is also present a quick disconnect coupling as provided for the embodiment of FIG. 2 to connect filter 108 with tank 17.

In the embodiment of FIG. 3, the filter 32 has mounted on its bottom end a bulbous valve 150 that engages the inner surface of flange 143 at the opening 18 of bottom wall 14 of tank 13. The self-cleaning filter 32 is operated by the motor of pump 31 mounted on top wall 16. However, filter 32 is separately supported by a shaft 151 that is connected to a piston 152 of an air cylinder 153 mounted on top of wall 16. The bottom chamber of cylinder 153 is in communication with a 2-position, 3-connection, directional valve (not shown) by a pipe 154. This directional valve in one position of its spool introduces compressed air into this bottom chamber of cylinder 153 to raise shaft 151 and thus raise filter 32 and valve 150. This permits flow of liquid from tank 13 to tank 17. The other position of the spool of the directional valve provides for an exhaust of pressurized air from this bottom chamber of cylinder 153 so that by gravity piston 152 is lowered and this results in the closing of opening 18 by valve 150. In addition, the construction can have a spring (not shown) that downwardly urges piston 152 to seal valve 150 against flange 143 when valve 150 is in its lowered position. The shaft 151 and other components between pump 31 and filter 32 are enclosed by a bellows-type casing 155.

The directional valve mentioned above is a solenoid-operated, spring-offset type. When the solenoid is not energized the spring provides the spool of this valve at a position which communicates the bottom chamber of cylinder 153 with an outlet that exhausts to the atmosphere. When the solenoid is energized, the spool of the valve is moved to the second position at which pressurized air is introduced into the bottom chamber of cylinder 153 for the lifting of valve 150 to permit flow of liquid out of opening 18 as described above.

The solenoid is energized by the closing of a contact of a first relay in the same manner as described earlier in connection with the embodiment shown in FIG. 1. This solenoid is de-energized when the coil of this first relay is de-energized upon the closing of switch 60 as described above.

In the embodiment of the invention shown in FIG. 4, there are two toilet bowls 11 mounted on two receiving tanks 13. Each tank 13 is provided with a filter 32, a pump 31 and valved means 19 as in the case of embodiment of FIGS. 1 and 2. The opening 18 of tank 13 is in communication with a pipe 160 or a pipe 161. The pipe 161 connects with pipe 160 that extends into an opening 162 in the top wall 163 of separate tank 17. The system of this embodiment has pipe 48 that connects with opening 39 in the bottom wall of tank 17 as in the case of earlier embodiments and opening 39 is closed by valve 38 that is connected to shaft 37. The cable 45 is connected to shaft 37 slidable in sleeve 36 mounted through the top wall 163 of tank 17. The cable 45 extends around pulleys 44 and 46 as in the case of FIG. 1. Likewise, the manual over-ride of valved means 19 for each tank 13 is provided by a cable 20 that extends over pulleys 24 and 25. One of cables 20 extends also around a pulley 170 and the other cable 20 extends around a pulley 171. These cables 20 and cable 45 extend over a pulley 172 and the other end of each cable is connected to handle 29. The pulling of handle 29 lifts simultaneously valve 38 of tank 17 and valves 23 of tanks 13. The automatic lifting and lowering, i.e., in effect the opening and closing, of valves 23 are separately controlled by their switches 55 and 60 as in the case of FIG. 1 described earlier.

In the embodiments of FIGS. 1 through 4 biological-odor filter 108 is mounted outside tank 17. The filter 108 can be inside tank 17.

In FIG. 4, relief valve 106 is downstream. Between valve 106 and pipe 109 there is a condenser generally indicated at 180 that is constructed to condense vapor obtained by the boiling of liquid in tank 17. This condensed liquid flows by a pipe 181 to a storage tank 182. The condensate can be used in the flushing of bowl 11 and tank 13 as well as of tank 17. This is provided by valved pipe 86 connected to tank 182. When condenser 180 has furnished a sufficient supply of liquid condensate to tank 182 all subsequent vapor passes through the condenser without any condensation and the passed vapor passes pipe 109 for dumping to the outside.

The condenser 180 is a tube-and-tank type of heat exchanger. It includes pipes 185 vertically disposed with their ends communicating with a top header 186 and a bottom header 187 connected to inlet pipe 188 and outlet pipe 189. The pipe 188 is connected to a source of cold air (not shown) and pipe 189 can exhaust the air to the atmosphere.

The condenser 180 has a chamber 190 between headers 186 and 187. The chamber 190 has an inlet 191 at the upper portion and an outlet 192 also at the upper portion. A pipe 193 is connected to filter 108 and feeds vapor from tank 17 to condenser 180 via inlet 191. The vapor is partially condensed by contact with pipes 185 in chamber 190. Uncondensed vapor leaves by outlet 192 and a pipe 195. Condensate in chamber flows into tank 182. The level of liquid rises in tank 182 and in chamber 190 until pipes 185 are sufficiently covered by liquid to preclude further condensation until the level of liquid drops by the withdrawal of liquid from tank 185 via pipe 86. The pipe 195 is connected to relieve valve 106.

The condensate can be drained from condenser 180 to tank 182 by pipe 181 that is valved. The valve can be automatically closed when the liquid level in tank 182 exceeds a predetermined height and opened again when the level decreases. In addition to pipe 181 there can be a pump (not shown) to withdraw liquid from condenser 180 to tank 182 whenever the level of the latter goes below a predetermined height. When the motor is not operating, the level of liquid in condenser 180 rises until there is insufficient surface of pipes 185 to condense vapor from pipe 193. Then all vapor will pass out pipe 195 and ultimately dumped to the atmosphere via pipe 109.

The arrangement of tank 17 to tanks 13 in FIG. 4 is not such as to imply that tank 17 is directly below tanks 13. As a matter of fact, in the preferred construction pipes 160 and 161 are inclined downwardly to feed liquid to tank 17 positioned at some location remote with respect to tanks 13. This permits the use of tank 17 for a large number of bowls 11 and tanks 13.

In FIGS. 1 and 4 manual opening of valve 23 is provided by pulling handle 29 connected to shaft 21 by cable 20. In FIG. 2, handle 29 is connected directly to the top end of shaft 21 because cable 20 is not needed. This is because there is no servicing of the system from outside the fuselage. Instead the package of tanks 13 and 17, etc. are removed from the airplane for servicing.

The foregoing description of various embodiment of the present invention have been presented for purpose of illustration of the invention. Many modifications including combinations of some features shown in one embodiment and not utilized in another will be suggested to one skilled in the art in view of the foregoing description and the drawings. For example, the embodiment of FIG. 4 shows the use of filters 32 and pumps 31 to provide filtered liquid from tank 13 for the purpose of flushing toilet bowls 11. These components can be absent in a modification in which such flushing liquid is provided by condensation in tank 182.

We claim:
1. A toilet and waste storage system which comprises:
 (1) a first tank having an opening in its bottom and having another opening to be connected to a conduit connected to a toilet bowl to receive waste liquid from the bowl;
 (2) a second tank having first and second openings;
 (3) a conduit means connecting the second tank at its first opening to the first tank by the bottom opening of the first tank for communication between the tanks;
 (4) valved means to close and open the communication between the tanks by the conduit means;
 (5) liquid level-sensing means mounted in the first tank and responsive to a predetermined maximum level of liquid in the first tank to operate said valved means for opening the valved means to transfer liquid from the first tank to the second tank;
 (6) means responsive to a predetermined condition during the transfer of liquid to operate said valved means for closing the valved means;
 (7) heater means mounted on the second tank to volatilize out its second opening at least part of the waste liquid transferred from the first tank to the second tank through the conduit means; and
 (8) means to provide aqueous liquid from waste liquid in one of said tanks to serve as a flushing liquid for the toilet bowl.

2. The system of claim 1 wherein said means to provide aqueous liquid includes:
(1) a pump having an inlet in said first tank and having an outlet to communicate by a conduit with the upper portion of the toilet bowl; and
(2) a filter interposed between the inlet of said pump and the interior of said first tank to provide filtered aqueous liquid to the pump from the contents in said first tank.

3. The system of claim 2 wherein said means responsive to a predetermined condition comprises a second liquid level-sensing means mounted in the first tank and responsive to a predetermined minimum level of liquid in the first tank to operate said valved means for closing the valved means.

4. The system of claim 3 and further including a toilet bowl mounted on the first tank, said bowl having a bottom portion with a bottom outlet and said bottom portion being disposed within said first tank.

5. The system of claim 4 wherein said first tank is mounted directly above said second tank with the bottom opening of the first tank in alignment with the first opening of the second tank.

6. The system of claim 5 wherein the bottom wall of said first tank provides the top wall of said second tank and the bottom opening of said first tank is common with the first opening of said second tank.

7. The system of claim 2 wherein said filter is disposed above the bottom opening of said first tank and has a bottom with a construction adapted to serve as a valve of said valved means and wherein said system includes means to raise and lower said filter so as to open and close the communication between the tanks.

8. The system of claim 4 and further including an additional toilet bowl mounted on an additional first tank with the additional bowl having its bottom portion disposed within the additional first tank, said additional first tank having associated with it conduit means connecting it to the second tank, valved means, liquid level-sensing means and means responsive to a predetermined condition as are associated with the first tank.

9. The system of claim 1 wherein said means to provide aqueous liquid includes a condenser and conduit means connected to said second tank to condense at least part of the material volatilized out said second opening and to furnish said condensate as the aqueous liquid to the toilet bowl.

10. The system of claim 1 and further including:
(1) a toilet bowl mounted on the first tank, said bowl having a bottom portion with a bottom outlet and said bottom portion being disposed within said first tank;
(2) a wash basin; and
(3) conduit means connecting the outlet of said wash basin to one of said first and second tanks.

11. The system of claim 10 wherein said conduit means connecting said wash basin and one of said first and second tanks includes:
(1) a conduit connected to the first tank;
(2) a conduit connected to the second tank;
(3) a three-way valve connected to said conduits; and
(4) a conduit connecting said three-way valve and the outlet of said wash basin.

12. The system of claim 1 and further including:
(1) a toilet bowl mounted on the first tank, said bowl having a bottom portion with a bottom outlet and said bottom portion being disposed within said first tank; and
(2) wheeled support means mounted on said second tank and constructed to easily move at least said second tank when the wheels are lowered relative to said second tank to raise the second tank and providing a relatively fixed location for the second tank when the wheels are raised relative to said second tank,
said first tank being mounted directly above said second tank with the bottom opening of the first tank in alignment with the first opening of the second tank.

13. The system of claim 12 wherein said second tank is detachable from said first tank to provide for separate removal of said second tank relative to said first tank and said toilet bowl.

14. A toilet and waste storage system which comprises:
(1) an upper tank having an opening in its top and an opening in its bottom;
(2) a lower tank having an opening in its top and an opening in its bottom, said top opening of the second tank communicating with the bottom opening of the first tank;
(3) first valved means to close the bottom opening of the first tank;
(4) second valved means to close the bottom opening of the second tank;
(5) a toilet mounted above the first tank and having its bottom opening communicating with the top opening of the first tank;
(6) means to pump fluid from the upper tank to the toilet bowl;
(7) means to sense the rise of fluid to a predetermined upper level;
(8) means responsive to the sensing means to open the first valved means;
(9) means in the upper tank and in the lower tank to direct flushing liquid against the side walls of the tank; and
(10) heater means at the bottom of the lower tank, said lower tank having an outlet in the top portion to permit vapor removal from the tank.

15. The system of claim 14 wherein the upper tank and the lower tank have a common wall that provides the bottom of the upper tank and the top of the lower tank.

16. The system of claim 15 wherein said common wall is inclined from the periphery of the tank to the area of the opening between the tanks and the bottom of the bottom tank is inclined.

17. The system of claim 16 wherein the first valved means is moved to close the opening between the two tanks by a sensing means initiated by the lowering of the fluid level in the upper tank to a predetermined level.

18. The system of claim 17 and further including a wash basin and conduit means communicating the outlet of the wash basin to the upper tank.

19. The system of claim 18 wherein the first valved means is constructed to be opened independent of the level sensing means.

20. The system of claim 19 wherein the independent means for opening the first valved means is operated concurrently with the opening of the second valved means.

21. A toilet and waste storage system which comprises:
(1) a first tank having an opening in a top portion of the tank to receive waste liquid from a toilet bowl and having a second opening;
(2) a second tank having first and second openings;
(3) conduit means connecting the second tank at its first opening to the first tank by the second opening of the first tank for communication between the tanks;
(4) valved means to close and open the communication between the tanks by the conduit means;
(5) liquid level-sensing means mounted in the first tank and responsive to a predetermined maximum level of liquid in the first tank to operate said valved means for opening the valved means to transfer liquid out the second opening of the first tank to the second tank;
(6) means responsive to a predetermined condition during the transfer of liquid to operate said valved means for closing the valved means; and
(7) heater means mounted on the second tank to volatilize out its second opening at least part of the waste liquid transferred from the first tank to the second tank through the conduit means.

References Cited

UNITED STATES PATENTS

| | | | |
|---|---|---|---|
| 1,303,358 | 5/1919 | Montgomery | 4—10 XR |
| 2,798,227 | 7/1957 | Boester | 4—10 |
| 2,798,228 | 7/1957 | Boester | 4—10 |
| 2,858,939 | 11/1958 | Corliss | 4—10 XR |
| 3,067,433 | 12/1962 | Dietz et al. | 4—90 XR |
| 3,169,497 | 2/1965 | Blankenship | 4—131 XR |
| 3,172,131 | 3/1965 | Herkenhine et al. | 4—115 |
| 3,320,621 | 5/1967 | Vita | 4—10 |
| 3,401,115 | 9/1968 | Meyer et al. | 4—10 XR |

LAVERNE D. GEIGER, Primary Examiner

H. K. ARTIS, Assistant Examiner

U.S. Cl. X.R.

4—90